United States Patent
Brouet et al.

(10) Patent No.: US 6,973,051 B2
(45) Date of Patent: Dec. 6, 2005

(54) METHOD FOR ASSIGNING RESOURCES IN A SHARED CHANNEL, A CORRESPONDING MOBILE TERMINAL AND A CORRESPONDING BASE STATION

(75) Inventors: Jérôme Brouet, Paris (FR); Vinod Kumar, Paris (FR)

(73) Assignee: Alcatel, Paris (FR)

( * ) Notice: Subject to any disclaimer, the term of this patent is extended or adjusted under 35 U.S.C. 154(b) by 983 days.

(21) Appl. No.: 09/837,489

(22) Filed: Apr. 19, 2001

(65) Prior Publication Data
US 2002/0031119 A1  Mar. 14, 2002

(30) Foreign Application Priority Data
Apr. 28, 2000  (EP) ................. 00440117

(51) Int. Cl.[7] ............................................. H04B 7/005
(52) U.S. Cl. .................. 370/278; 370/346; 370/449; 709/105
(58) Field of Search .................. 370/346, 336, 370/335, 347, 312, 442, 443, 337, 349, 449, 370/461, 462, 338, 539, 254, 278, 282; 455/574, 455/63, 422; 379/60; 709/105, 203

(56) References Cited

U.S. PATENT DOCUMENTS

| | | | |
|---|---|---|---|
| 5,404,392 A * | 4/1995 | Miller et al. | 455/466 |
| 5,513,183 A | 4/1996 | Kay et al. | 370/337 |
| 5,553,074 A | 9/1996 | Acampora | 370/349 |
| 6,049,549 A | 4/2000 | Ganz et al. | 370/449 |
| 6,480,505 B1 * | 11/2002 | Johansson et al. | 370/449 |
| 6,526,030 B2 * | 2/2003 | Rezaiifar et al. | 370/335 |
| 6,850,510 B2 * | 2/2005 | Kubler et al. | 370/338 |
| 2002/0057709 A1 * | 5/2002 | Edmon et al. | 370/442 |
| 2003/0002464 A1 * | 1/2003 | Rezaiifar et al. | 370/336 |

FOREIGN PATENT DOCUMENTS

| | | |
|---|---|---|
| EP | 0 398 380 A2 | 11/1990 |
| EP | 0 495 600 A1 | 7/1992 |

* cited by examiner

*Primary Examiner*—John Pezzlo
(74) *Attorney, Agent, or Firm*—Sughrue Mion, PLLC

(57) ABSTRACT

The invention relates notably to a method for assigning resources in a shared channel of a communication network including a master station and a plurality of slave stations communicating with the master station over the shared channel. The master station sends transmit authorizations to the slave stations authorizing them to transmit at least a traffic packet on the shared channel. A slave station may have inactivity periods during which it has no traffic packet to transmit. A maximum time interval between two transmit authorizations, called activity time interval, is ensured during non inactivity periods for each slave station. The method includes a step of transmitting to the master station a silence indication upon reception of a transmit authorization at a slave station during an inactivity period and increasing the maximum time interval between two transmit authorizations for the slave station upon reception of the silence indication at the master station.

8 Claims, 3 Drawing Sheets

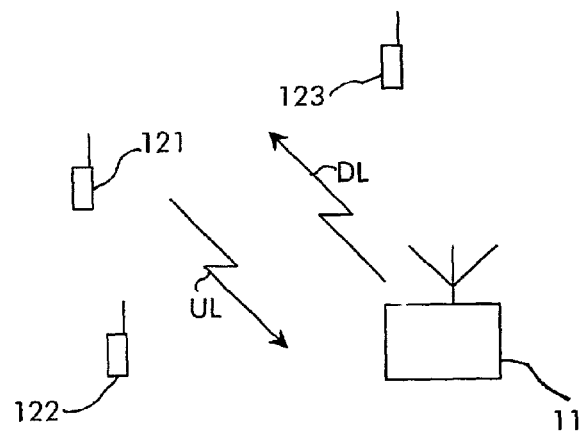
Fig 1
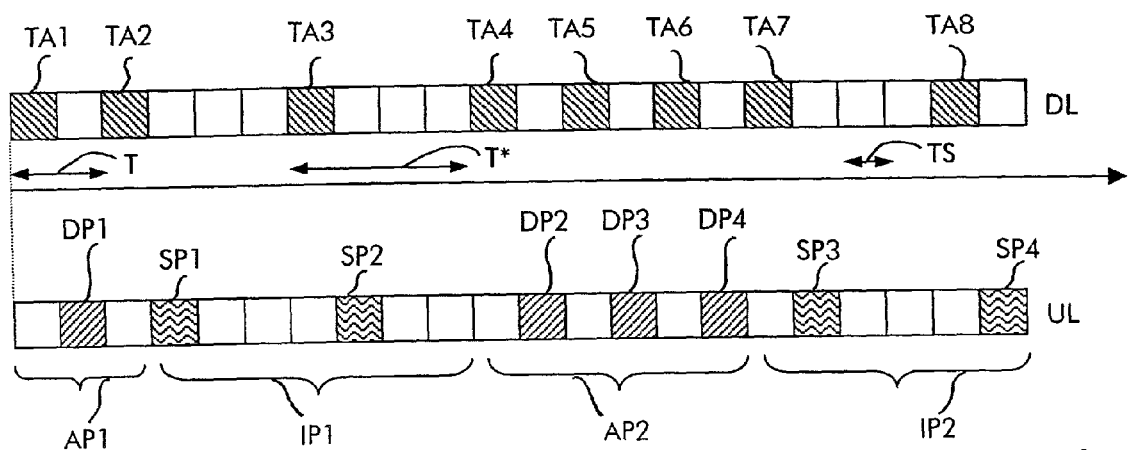
Fig 2a
Fig 2b

METHOD FOR ASSIGNING RESOURCES IN A SHARED CHANNEL, A CORRESPONDING MOBILE TERMINAL AND A CORRESPONDING BASE STATION

BACKGROUND OF THE INVENTION

The present invention relates to the field of telecommunications and more particularly to a resource assignment method for multiple access to a shared communication channel.

The description below refers to a resource assignment method for multiple access to a shared communication channel of a data communication network. It applies to fixed data communication networks, for example an ATM or IP fixed networks, as well as to wireless data communication networks, like GPRS (Global Packet Radio Service)or EDGE (Enhanced Data Rate for GSM Evolution).

In the framework of this invention, the resources of the shared communication channel are dynamically assigned to different users who need to access to the shared communication channel. A centralized unit, called master station in the following description, manages the resource assignment to the users sharing the communication channel, called slave stations in the following description. Considering a wireless communication network, the shared communication channel can be a radio channel, the master station, a base station and the slave stations, mobile terminals under the coverage of the base station.

The shared communication channel is considered as time-shared in the following description. However, code-sharing, frequency-sharing, or a combination of them with time-sharing is also compatible with the implementation of the present invention.

A common method for assigning resources on a shared medium in a centralized way consists in that the master station sends transmit authorizations to the slave stations each time they are allowed to transmit an information packet. This mechanism is usually called "polling" and the transmit authorization are often referred in the state of the art as "tokens". The master station takes care that only one slave station is allowed to send a data packet at the same time on the shared medium in order to avoid collisions. The master station also takes care that the traffic requirements of all slave stations are taken in account to allocate the resources on the shared medium. For the master station, the usual way of polling slave stations sharing the same communication channel consists in determining for each slave station a polling period depending usually on the transmission rate required by each slave station during a preliminary phase. The term polling period has to be understood as the time interval between two transmit authorizations sent to the same slave station.

An example illustrates this concept of polling period: if two slaves station are sharing a time-shared communication channel, the first slave station having required a transmission rate twice as high as the second slave station, the first slave station will have a polling period twice as short as the second slave station.

This polling mechanism however does not optimize the resource allocation on the shared channel since, in most data communication network, data services have not a constant bit rate but a bit rate varying strongly in the time from nothing to transmit to a peak bit rate (bursts). Then, during an inactivity period, a slave station has no information to send and will unnecessarily be polled.

U.S. Pat. No. 5,513,183 describes a mobile phone system multiplexing plural voice traffic channels on a single carrier using TDMA. The described method consists in assigning voice traffic capacity not on a conversational basis but on an informational spurt basis. When a voice terminal detects a speech spurt to send, it formulates a channel allocation request on a control channel. The fixed station look for available traffic slots in a pool and affects a free one to the terminal. The terminal tunes its transmitter on the affected traffic slot. When the terminal detects the termination of the speech spurt and enters an inactivity period, it informs the fixed station over a control channel. Upon reception of such a inactivity indication, the master station releases the traffic slot back to the pools of available traffic slots.

A disadvantage of this method is that a control channel is required to convey the signaling information on spurt begin and termination. A logical link must be established/released between the terminal and the fixed station depending on voice activity.

Another disadvantage of this solution is that the re-establishment procedure needs to be very fast in order to comply with the voice traffic delay constraints.

A particular object of the present invention is to enhance the capacity of a data communication network by allocating unused resources during an inactivity period of a slave station to other slave stations without using a control channel to establish/release a logical link between the slave station and the mobile.

SUMMARY OF THE INVENTION

This object, and others that appear below, are achieved by a method for assigning resources in a shared channel of a communication network comprising a master station and a plurality of slave stations communicating with the master station over the shared channel, the master station sending transmit authorizations to the slave stations authorizing them to transmit at least a traffic packet on the shared channel, at least one of the slave stations having inactivity periods during which it has no traffic packet to transmit, a maximum time interval between two transmit authorizations, called activity time interval, being ensured during non inactivity periods for each slave station, the method comprises the steps of:
  transmitting to the master station a silence indication upon reception of a transmit authorization at a slave station during an inactivity period; and;
  increasing the maximum time interval between two transmit authorizations for the slave station upon reception of the silence indication at the master station.

An advantage of the present invention is to simplify the implementation of a slave station which need not to indicate the beginning and the end of an inactivity period since the master station further monitors new activity periods at the slave station.

Another advantage of the present invention is that the inactivity indication can be sent on the communication channel itself.

The present invention also concerns a mobile terminal of a radio communication network receiving transmit authorizations when authorized to transmit a packet, the mobile terminal having inactivity periods during which it has no packet to transmit, the mobile terminal comprising
  an inactivity detector to detect an inactivity period; and
  a predefined silence packet generator to transmit a predefined silence packet upon reception of a transmit authorization during one of said inactivity periods.

The present invention also concerns a master station for assigning resources on a shared channel of a communication network to a plurality of slave stations, the master station comprising a resource assignment module to assign transmit authorizations to the slave stations to authorize each of them to transmit packets on the shared channel a silence packet detector to detect a predefined silence packet received on the shared channel; and a time interval adjuster to modify the maximum time interval between two transmit authorizations sent to the slave station upon reception of a silence packet from the slave station.

This invention is based on a priority application EP 00 44 0117 which is hereby incorporated by reference.

BRIEF DESCRIPTION OF THE DRAWINGS

Other characteristics and advantages of the invention will appear on reading the following description of a preferred implementation given by way of non-limiting illustrations, and from the accompanying drawings, in which:

FIG. 1 shows a part of a radio communication network in which the present invention can be used;

FIG. 2 represents the contents of a downlink channel (FIG. 2A) and of the corresponding uplink channel (FIG. 2B) simulating a resource allocation scenario using the method of the present invention;

DETAILED DESCRIPTION OF THE INVENTION

Figure 3:
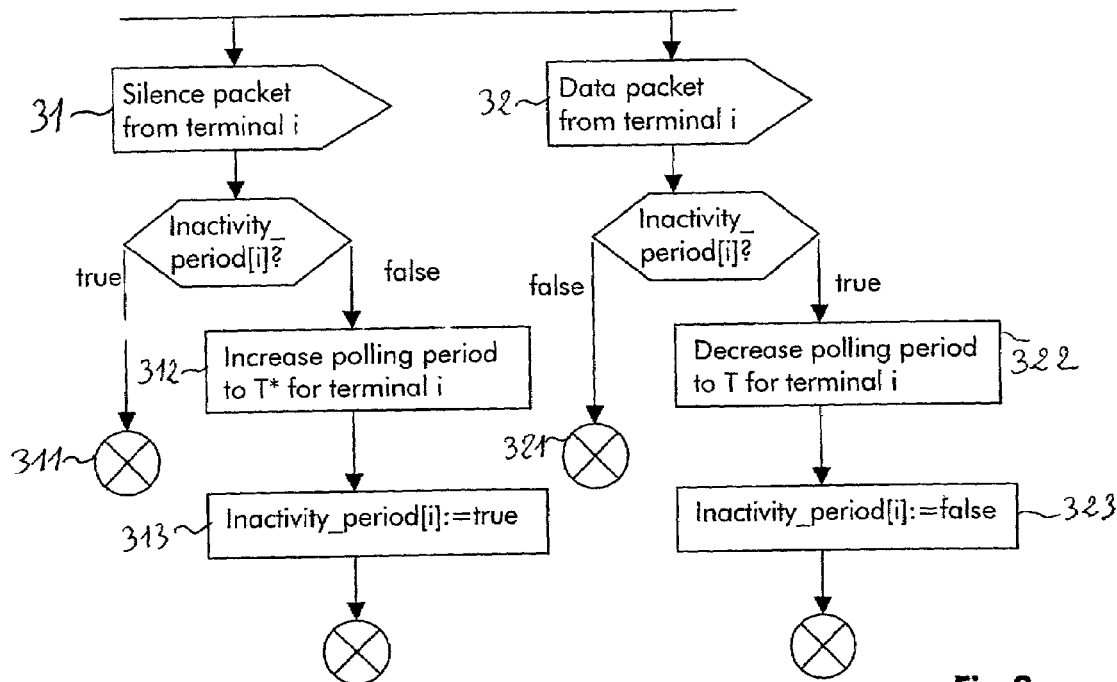
FIG. 3 shows a state diagram giving a possible implementation of the method at a base station of a radio communication network.

FIG. 1 illustrates three mobile terminals 121, 122, 123 and a base station 11 part of a radio communication network.

Mobile terminals 121, 122, 123 are situated in the coverage area of base station 11 and communicate with base station 11 on the uplink by sending data packets over the air interface on a shared radio communication channel UL. The shared radio communication channel UL is preferably a time-shared channel comprising a succession of time slots. To avoid collisions, two mobile terminals are not allowed to transmit packets in the same time slot. Base station 11 transmits authorizations to mobile terminals 121, 122, 123 on a downlink communication channel DL which can be read by all mobile terminals 121, 122, 123.

Preferably, the downlink communication channel DL is also a time-shared channel, each time slot of which comprising a field indicating which mobile terminal is assigned the "corresponding time-slot" in the shared uplink communication channel UL.

In usual TDMA communication systems the term "corresponding time slot" indicates the time slot in the next frame of the uplink communication channel UL having the same position in the frame as the time slot in which the transmit authorization has been transmitted on the downlink communication channel DL.

The term "corresponding time slot" must also be understood by taking into account the propagation delay between base station 11 and mobile terminals 121, 122, 123 and the difference of propagation delay to the different mobile stations depending on the distance between base station 11 and each of them. Well known timing advance mechanisms may be implemented so that all mobile stations have a common time reference regarding to what is the "corresponding time-slot" in the shared uplink communication channel UL.

Any other definition of the term "corresponding time slot" can also be considered in the framework of this invention and not interfering with principles of the present invention. For example, assumed that all mobile stations 121, 122, 123 have a common time reference, the "corresponding time slot" TS(UL) on the uplink shared channel UL may be the next following time slot on the uplink channel UL after the reception of the considered time slot TS(DL) on the downlink channel at mobile stations 121, 122, 123.

Mobile terminals 121, 122, 123 are supporting different type of traffics comprising activity as well as inactivity periods. An activity period is defined as a period of time during which a mobile terminal has data waiting for transmission in a transmit buffer. On the contrary, an inactivity period is a period during which a mobile terminal has no data waiting for transmission in the transmit buffer. Alternatively, a configuration where less data than a predefined threshold level are waiting for transmission in the transmit buffer can also be considered as belonging to an inactivity period. Preferably the residence time of data in the transmit queue also influences the definition of an inactivity period.

Most data services defined by their average bit rate and their peak bit rate belong to the class of services with activity and inactivity periods. Such services are unlikely to have a constant bit rate over a long period of time and are characterized by the transmission of bursts. Voice services where voice is packetized can also be considered as a traffic with activity and inactivity periods since a silence in the speech flow is a period where no information needs to be transmitted.

FIG. 2 represents the contents of downlink channel DL (FIG. 2A) and of uplink shared channel UL (FIG. 2B) simulating a resource allocation scenario using the method of the present invention. Downlink channel DL as well as uplink shared channel UL are divided in time slots. The time slot duration TS has been chosen identical for both uplink and downlink channel. This is not a prerequisite for the purpose of the present invention. The time slot duration can be chosen independently on downlink and uplink channel.

The contents of downlink channel DL is considered at base station 11, the contents of uplink channel UL is considered for example at mobile station 121. Downlink channel DL and uplink shared channel UL are aligned on a time axis so that a time slot on the downlink transmitted at time t contains a transmit authorization for a mobile station allowed to transmit a packet in the time slot transmitted at time t+TS on the uplink channel UL. This representation is a simplified representation assuming that the propagation delay between base station 11 and mobile terminal 121 is less than TS. This has only been chosen for a better readability of the figure and can be adapted according to any other propagation delay.

The activity periods of mobile terminal 121 are referred as AP and the inactivity periods are referred as IP referred on FIG. 2B. A first activity period AP1 expands over the first three slots, a first inactivity period IP1 expands over the seven following slots, a second activity period AP2 expands over the six following slots and a second inactivity period IP2 expands over the six following slots. This configuration is only chosen for purpose of illustration the principles showed by way of this scenario can be extended to any other scenario.

During an activity period AP1, AP2 base station 11 has to send transmit authorizations TA1, TA2, TA5, TA6, TA7 to mobile station 121 with a polling period T equal to 2*TS on downlink channel DL to fulfill the requirements of mobile station 121. When a transmit authorization is received during an activity period of mobile terminal 121, the latter transmits a data packet DP1, . . . , DP4 in the next time slot of uplink shared channel UL. When a transmit authorization TA2, TA3, TA7, TA8 is received during an inactivity period IP1, IP2 of mobile terminal 121, the latter transmits a predefined silence packet SP1, . . . , SP4 in the next time slot of uplink shared channel UL. Upon reception of a predefined silence packet at base station 11, the latter increases the period between two transmit authorizations TA3, TA4, TA8 sent to mobile station 121. In the described scenario, a polling period T*=4*TS is used during an inactivity period a mobile terminal 121.

In the described embodiment, mobile station 121 transmits a silence packet each time it is polled during an inactivity period. Alternatively, it may only send a silence packet the first time it is polled during an inactivity period. This correspond on FIG. 2 to (TA2, SP1) and (TA6, SP3). It is not necessary for the implementation of the present invention, that mobile station 121 sends further silence packets as long as it has no further data packet to send. Mobile station may send no packet instead of silence packets SP2 and SP4 to answer to transmit authorizations TA3 and TA8.

Upon reception of a data packet DP2 after an inactivity period IP1, base station detects that mobile station 121 has entered a second activity period AP2 and restores polling period T=2*TS used during the first activity period of mobile terminal 121.

The relation between polling period T during an activity period and polling period T* during an inactivity period is a predetermined function. This function can be a simple proportionality factor ensuring that T* is greater than T or a more complex function taking the load on shared uplink channel UL in account as well as the type of service supported by the mobile terminal entering an inactivity period.

In another embodiment, the polling period during an inactivity period may also vary depending on the duration of the inactivity period or on the load of shared uplink channel. It can for example be envisaged that statistical estimations of inactivity period duration are known at base station 11 for each type of services and that a first polling period T1* is defined for a first time interval of the inactivity period. If the terminal is still inactive after the end of the first time interval, a second polling period is determined for a second time interval following the first time interval and so on a sequence (Ti*) 1<=i<=N of N polling periods can be associated to successive time interval of a unique inactivity period.

FIG. 3 shows a state diagram giving a possible implementation of the method of the present invention at base station 121.

Two event types are possibly handled at base station 11. The first event type 31 is the reception of a data packet, the second event type 32 is the reception of a predefined silence packet.

Upon reception of a silence packet from terminal i, base station checks if terminal i is already in an inactivity period.
If true, it terminates (Step 311).

If false, it increases the polling period for terminal i to a predefined polling period T* (step 312), sets the variable inactivity_period for terminal i to true (step 313) and terminates.

Upon reception of a traffic packet from terminal i, base station checks if terminal i is already in an inactivity period.
If false, it processes the contents of the data packet as usual and terminates (Step 321).
If true, it decreases the polling period for terminal i to a predefined polling period T Step 322), sets the variable inactivity_period for terminal i to false (Step 323) and terminates.

Figure 4:
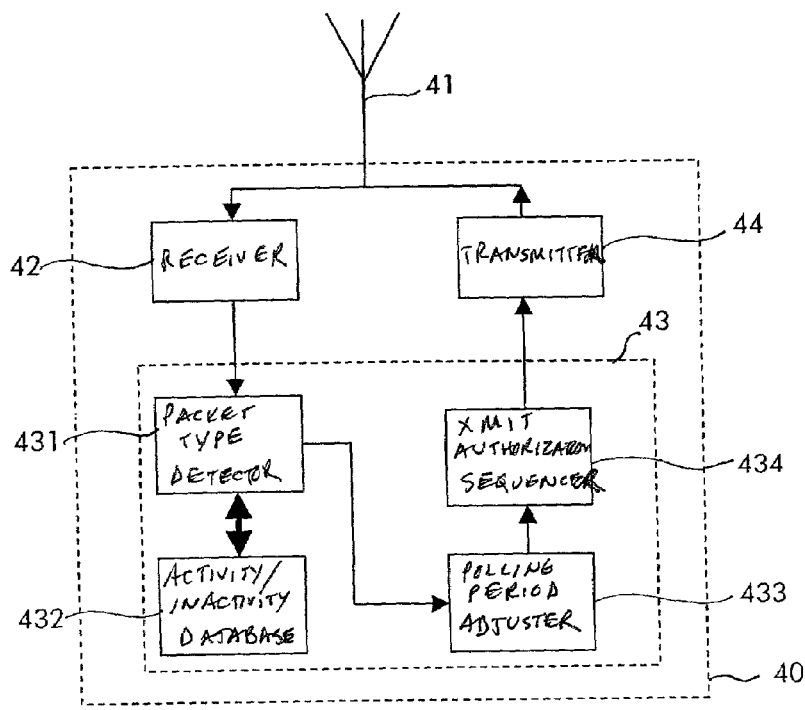
FIG. 4 represents an embodiment of a base station according to the present invention.

FIG. 4 represents an embodiment of a base station 40 according to the present invention comprising an antenna 41, a receiver 42, a resource assignment module 43 and a transmitter 44. Resource assignment module 43 comprises a packet type detector 431, a terminal activity/inactivity database 432, a polling period adjuster 433 and a transmit authorization sequencer 434.

The contents of uplink channel UL described in FIG. 2 is received through antenna 41 at receiver 42 and transmitted to resource assignment module 43 which determines which mobile terminal needs transmit authorizations. These transmit authorizations are communicated to transmitter 44 which includes the transmit authorizations in a predefined field in each time slots of downlink channel DL.

The contents of uplink channel UL is analyzed on a slot by slot basis at packet type detector 431 which detects if a data packet or a predefined silence packet is contained in a considered time slot and which mobile terminal is at the origin of this packet. Packet type detector 431 then send a request to terminal activity/inactivity database 432 which contains the latest status of each mobile terminals in the coverage of base station 40. The request checks the latest status of the mobile terminal from which packet type detector 431 has received a packet. If the status has changed compared to the latest status stored in terminal activity/inactivity database 432, the new status is stored in it. Packet type detector 431 triggers polling period adjuster 433 preferably only when a status change has been detected. Polling period adjuster 433 determines the new time interval between two transmit authorization sent to the mobile terminal whose status has changed. Polling period adjuster 433 triggers a transmit authorizations sequencer 434 which looks for combining the transmit authorization for all mobile terminals under the coverage area of base station 40 to fulfill the requirements set by polling period adjuster 433.

Figure 5:
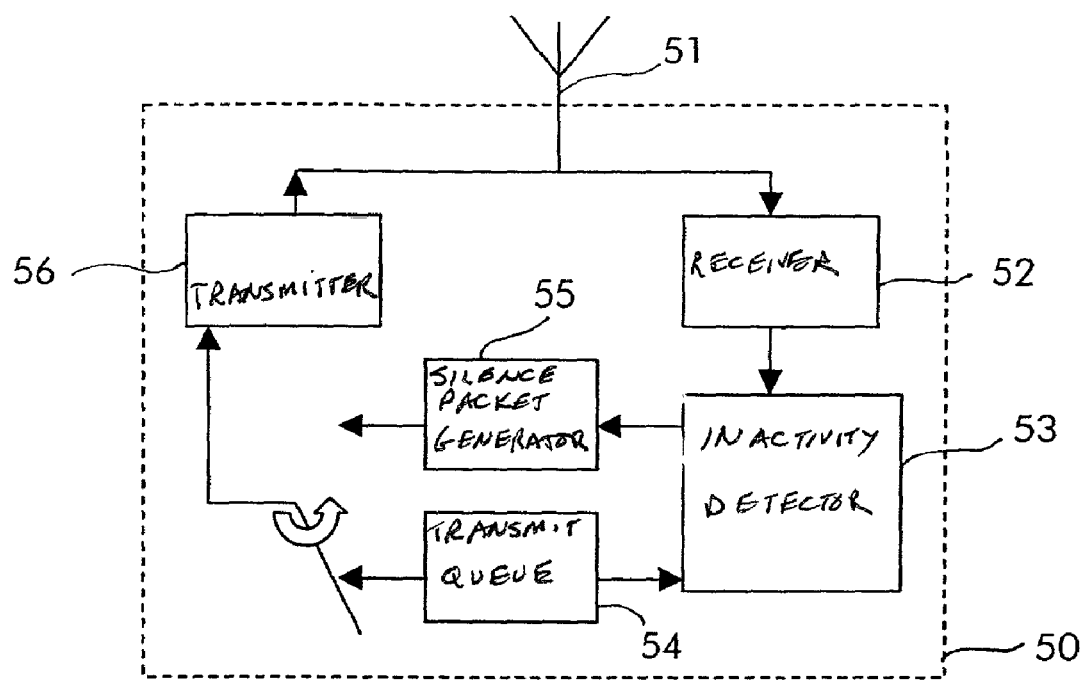
FIG. 5 represents an embodiment of a mobile terminal according to the present invention.

FIG. 5 represents an embodiment of a mobile station 50 comprising an antenna 51, a receiver 52, an inactivity detector 53, a transmit queue 54, a silence packet generator 55 and a transmitter 56.

Receiver 52 receives through antenna 51 the contents of downlink channel DL described in FIG. 2B and checks if each successive received time slot comprises a transmit authorization for mobile terminal 50. When a transmit authorization for mobile terminal 50 is detected receiver 52 triggers inactivity detector 53. Inactivity detector checks if mobile terminal 50 is currently in an activity or in an inactivity period. For this purpose inactivity detector 53 checks the status of transmit queue 54. If transmit queue is empty mobile terminal 50 is during an inactivity period if transmit queue is not empty mobile terminal is during an activity period. As already mentioned above, other criteria more accurate than the emptiness of transmit queue 54 but also related to the status of transmit queue 54 may be used to define the occurrence of an inactivity period.

Inactivity detector 53 triggers transmit queue 54 if the terminal is during an activity period so that a data packet is generated in transmit queue 54 and transmitted to transmitter 56. Alternatively, inactivity detector triggers silence packet generator 55 if the terminal is during an inactivity period so that a predefined silence packet is generated at silence packet generator 55 and transmitted to transmitter 56. Transmitter 56 transmits the data packet or the silence packet on the uplink channel UL over antenna 51.

What is claimed is:

1. A method for assigning resources in a shared channel of a communication network comprising a master station and a plurality of slave stations communicating with said master station over said shared channel, said master station sending transmit authorizations to said slave stations authorizing each of them to transmit at least a traffic packet on said shared channel, at least one of said slave stations having inactivity periods during which said slave station has no traffic packet to transmit, a maximum time interval between two transmit authorizations, called activity time interval, being ensured during non inactivity periods for each slave station, wherein said method comprises:

transmitting to said master station a silence indication upon reception of a transmit authorization at said slave station during an inactivity period; and increasing said maximum time interval between two transmit authorizations for said slave station upon reception of said silence indication at said master station, wherein said maximum time interval, upon reception of said silence indication, is increased by a value dependent upon a duration of said inactivity period.

2. The method according to claim 1, wherein the method further comprises restoring, at said master station, said activity time interval between two transmit authorizations for said slave station upon reception of a traffic packet from said slave station after an inactivity period.

3. The method according to claim 1, wherein said silence indication is a predefined silence packet transmitted by said slave station on said shared channel to said master station.

4. The method according to claim 1, wherein successive time intervals between transmit authorizations sent to a slave station during an inactivity period of said slave station are dependent upon a load of said shared channel.

5. The method according to claim 1, wherein said master station is a base station of a radio communication network and said slave stations are mobile terminals of said radio communication network sharing an uplink communication channel, said base station broadcasting transmit authorizations on a downlink channel to said mobile terminals, said activity time interval between two transmit authorizations being determined at said base station for each mobile terminal depending on the traffic characteristics supported by said mobile terminal.

6. The method according to claim 1, wherein said uplink communication channel is a time-shared communication channel, said base station broadcasting transmit authorizations on a downlink channel indicating which time slot of said uplink communication channel has to be used by the terminal authorized to transmit.

7. A master station for assigning resources on a shared channel of a communication network to a plurality of slave stations, said master station comprising:

a resource assignment module to assign transmit authorizations to said slave stations to authorize each of them to transmit packets on said shared channel;

a silence packet detector to detect a predefined silence packet received on said shared channel; and a time interval adjuster to modify the maximum time interval between two transmit authorizations sent to a slave station upon reception of a silence packet from said slave station, said time interval adjuster comprising means for increasing said maximum time interval upon reception of said silence indication by a value dependent upon a duration of said inactivity period.

8. A master station according to claim 7, wherein said master station is a base station part of a radio communication network, said base station comprising a resources assignment module to assign resources on a shared channel to a plurality of mobile terminals by sending transmit authorizations to authorize said mobile terminals to transmit packets on said shared channel.

* * * * *